United States Patent
Das et al.

(10) Patent No.: US 8,611,677 B2
(45) Date of Patent: Dec. 17, 2013

(54) METHOD FOR EVENT-BASED SEMANTIC CLASSIFICATION

(75) Inventors: Madirakshi Das, Penfield, NY (US);
Alexander C. Loui, Penfield, NY (US);
Mark D. Wood, Penfield, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 897 days.

(21) Appl. No.: 12/273,600

(22) Filed: Nov. 19, 2008

(65) Prior Publication Data
US 2010/0124378 A1 May 20, 2010

(51) Int. Cl.
| G06K 9/62 | (2006.01) |
| G06K 9/46 | (2006.01) |
| G06K 9/66 | (2006.01) |
| G06K 9/54 | (2006.01) |
| G06K 9/60 | (2006.01) |
| G06F 7/00 | (2006.01) |
| G06F 17/30 | (2006.01) |
| G06F 12/00 | (2006.01) |

(52) U.S. Cl.
USPC .......... 382/225; 382/159; 382/195; 382/224; 382/305; 707/737; 707/821

(58) Field of Classification Search
USPC ......... 382/100, 162, 168, 181, 190, 224–228, 382/278, 305, 155, 159, 195; 707/821–831; 715/200, 240
See application file for complete search history.

(56) References Cited

U.S. PATENT DOCUMENTS

| 5,781,650 A | 7/1998 | Lobo et al. |
| 6,240,424 B1 | 5/2001 | Hirata |
| 6,351,556 B1 | 2/2002 | Loui et al. |
| 6,504,951 B1 | 1/2003 | Luo et al. |
| 6,606,411 B1 | 8/2003 | Loui et al. |
| 6,915,011 B2 | 7/2005 | Loui et al. |
| 2003/0195883 A1 | 10/2003 | Mojsilovic et al. |
| 2005/0105775 A1 | 5/2005 | Luo et al. |
| 2005/0105776 A1 | 5/2005 | Luo et al. |
| 2006/0074771 A1* | 4/2006 | Kim et al. ........................ 705/26 |

(Continued)

FOREIGN PATENT DOCUMENTS

| EP | 1 510 944 A1 | 3/2005 |
| JP | 2006-171888 | 6/2006 |

(Continued)

OTHER PUBLICATIONS

S.-F. Chang, D. Ellis, W. Jiang, K. Lee, A. Yanagawa, A.C. Loui and J. Luo, Large-Scale Multimodal Semantic Concept Detection for Consumer Video, Proc. ACM Int'l Workshop Multimedia Information Retrieval, pp. 255-264, 2007.*

(Continued)

Primary Examiner — Randolph I Chu
Assistant Examiner — Nathan Bloom

(57) ABSTRACT

A method of automatically classifying images in a consumer digital image collection, includes generating an event representation of the image collection; computing global time-based features for each event within the hierarchical event representation; computing content-based features for each image in an event within the hierarchical event representation; combining content-based features for each image in an event to generate event-level content-based features; and using time-based features and content-based features for each event to classify an event into one of a pre-determined set of semantic categories.

20 Claims, 7 Drawing Sheets

(56) References Cited

U.S. PATENT DOCUMENTS

| | | | |
|---|---|---|---|
| 2006/0104520 A1* | 5/2006 | Kraus et al. | 382/225 |
| 2007/0098303 A1 | 5/2007 | Gallagher et al. | |
| 2007/0141545 A1* | 6/2007 | Tan et al. | 434/365 |
| 2007/0177805 A1 | 8/2007 | Gallagher | |
| 2008/0112621 A1 | 5/2008 | Gallagher et al. | |
| 2008/0205772 A1* | 8/2008 | Blose et al. | 382/225 |
| 2008/0235574 A1* | 9/2008 | Telek et al. | 715/240 |
| 2009/0297032 A1* | 12/2009 | Loui et al. | 382/195 |
| 2009/0299999 A1* | 12/2009 | Loui et al. | 707/5 |

FOREIGN PATENT DOCUMENTS

| | | |
|---|---|---|
| JP | 2007-317077 | 12/2007 |
| WO | 01/37131 | 5/2001 |
| WO | WO 2008/085383 A1 | 7/2008 |

OTHER PUBLICATIONS

Snoek, C.G.M.; Worring, M.;, "Multimedia event-based video indexing using time intervals," Multimedia, IEEE Transactions on , vol. 7, No. 4, pp. 638-647, Aug. 2005.*

Loui, A.C.; Savakis, A.; , "Automated event clustering and quality screening of consumer pictures for digital albuming," Multimedia, IEEE Transactions on , vol. 5, No. 3, pp. 390-402, Sep. 2003.*

Westermann, U.; Jain, R.; , "Toward a Common Event Model for Multimedia Applications," Multimedia, IEEE , vol. 14, No. 1, pp. 19-29, Jan.-Mar. 2007.*

Fan, Jianping, et al. "Mining multilevel image semantics via hierarchical classification." Multimedia, IEEE Transactions on 10.2 (2008): 167-187.*

Smeulders et al, Content-based Image Retrievalat the End of the Early Years, IEEE Trans. on Pattern Analysis and Machine Intelligence, 22(12) Dec. 2000.

Wei Jiang et al.: "Semantic Event Detection for Consumer Photo and Video Collections", Multimedia and Expo, 2008 IEEE International Conference On, IEEE, Piscataway, NJ, USA, Jun. 23, 2008, pp. 313-316, XP031312721, ISBN: 978-1-4244-2570-9, p. 313, Section 1, Lines 2-23, 40-46; Section 2, Lines 1-12; p. 314, Section 2.1, Lines 1-10, Section 2.2, Lines 1-19; p. 315, Section 2.2.2, Lines 15-29; p. 315, Section 3.1, Lines 1-7; p. 316, Table 1.

Loui Alexander C.: "Automative Image Event Segmentation and Quality Screening for Albuming Applications", Multimedia and Expo, 2000, ICME 2000, 2000 IEEE International Conference on New York, NY, USA, Jul. 30-Aug. 2, 2000, Piscataway, NJ, USA, IEEE, US, vol. 2, Jul. 30, 2000, pp. 1125-1128, XP010513207, ISBN: 978-0-7803-6536-0, abstract.

Boutell et al., "Learning multi-label scene classiffication," Pattern Recognition 37 (2004) pp. 1757-1771.

Boutell et al., "Review of the state of the art in semantic scene classification," Computer Science TR 799, University of Rochester, 2002, 40 pages.

Carneiro et al., "Supervised learning of semantic classes for image annotation and retrieval," IEEE Transactions on PAMI, Mar. 2007, pp. 394-410.

Communication from the European Patent Office on EP 09761050.5, mailed Mar. 2, 2012.

Han and Kamber, "Data Mining Concepts and Techniques," Elsevier, 2006, pp. 418-420.

Viola, P and Jones, M., "Rapid object detection using a boosted cascade of simple features," in Computer Vision and Pattern Recognition, 2001, Proceedings of the 2001 IEEE Computer Society Conference 2001, vol. 1, pp. I-511-I-518.

Office Action on JP Application 2011-536321, mailed Sep. 3, 2013 (English translation not available).

* cited by examiner

METHOD FOR EVENT-BASED SEMANTIC CLASSIFICATION

FIELD OF THE INVENTION

The invention relates generally to the field of digital image processing, and in particular to a method for classifying digital images into semantic categories.

BACKGROUND OF THE INVENTION

The proliferation of digital cameras and scanners has lead to an explosion of digital images, creating large personal image databases. The organization and retrieval of images and videos is already a problem for the typical consumer. Currently, the length of time spanned by a typical consumer's digital image collection is only a few years. The organization and retrieval problem will continue to grow as the length of time spanned by the average digital image and video collection increases, and automated tools for efficient image indexing and retrieval will be required.

Many methods of image classification based on low-level features such as color and texture have been proposed for use in content-based image retrieval. A survey of low-level content-based techniques ("Content-based Image Retrieval at the End of the Early Years," A. W. M. Smeulders et al, IEEE Transactions on Pattern Analysis and Machine Intelligence, 22(12), December 2000) provides a comprehensive listing of relevant methods that can be used for content-based image retrieval. The low-level features commonly described include color, local shape characteristics derived from directional color derivatives and scale space representations, image texture, image transform coefficients such as the cosine transform used in JPEG-coding and properties derived from image segmentation such as shape, contour and geometric invariants. Though these features can be efficiently computed and matched reliably, they usually have poor correlation with semantic image content.

There have also been attempts to compute semantic-level features from images. In WO 01/37131 A2, visual properties of salient image regions are used to classify images. In addition to numerical measurements of visual properties, neural networks are used to classify some of the regions using semantic terms such as "sky" and "skin." The region-based characteristics of the images in the collection are indexed to make it easy to find other images matching the characteristics of a given query image. U.S. Pat. No. 6,240,424 B1, discloses a method for classifying and querying images using primary objects in the image as a clustering center. Images matching a given unclassified image are found by formulating an appropriate query based on the primary objects in the given image. U.S. Patent Application Publication No. 2003/0195883 A1 computes an image's category from a pre-defined set of possible categories, such as "cityscapes."

These semantic-level features are also not the way users recall and search for images in their collection. Users' recollection of photographs is often based on the event that was captured. For example, photographs may be identified as "Grand Canyon vacation," "Mom's birthday party," "Joe's baseball league" and so on. There are mechanisms available in current software to manually enter such tags or captions to identify photographs. However, a need exists to automate this labor-intensive process, so that a user is able to search by common types of events without having to tag the images first. Further, the user can combine event type with other semantic features such as people present in the image, location or activity to narrow the search to relevant images.

SUMMARY OF THE INVENTION

It is an object of the present invention to classify images or videos in a digital image collection into one of several event categories. This object is achieved by a method of automatically classifying images in a consumer digital image collection, comprising:

(a) generating an event representation of the image collection;

(b) computing global time-based features for each event within the hierarchical event representation;

(c) computing content-based features for each image in an event within the hierarchical event representation;

(d) combining content-based features for each image in an event to generate event-level content-based features; and (e) using time-based features and content-based features for each event to classify an event into one of a pre-determined set of semantic categories.

The organization and retrieval of images and videos is a problem for the typical consumer. Automated tools are needed that can understand the content of the images and provide the ability to search the collection using semantic concepts such as events, people and places. This invention provides automatic classification of images in a collection into semantic event categories. This will permit the consumer to search for and browse images in the collection depicting specific events. The images and videos are automatically labeled with event category labels that can enable the automated generation of event-specific creative media outputs. This invention has the advantage of permitting users to search for images or videos in the collection that are part of specific event categories. Further, the invention has the advantage that images are automatically labeled with event category labels that can enable the automated generation of event-specific creative media outputs.

DETAILED DESCRIPTION OF THE INVENTION

The present invention can be implemented in computer systems as will be well known to those skilled in the art. The invention has been described in detail with particular reference to certain preferred embodiments thereof, but it will be understood that variations and modifications can be effected within the spirit and scope of the invention. Videos in a collection are treated as groups of keyframe images and included in the term "images" in the rest of the description.

Figure 1:
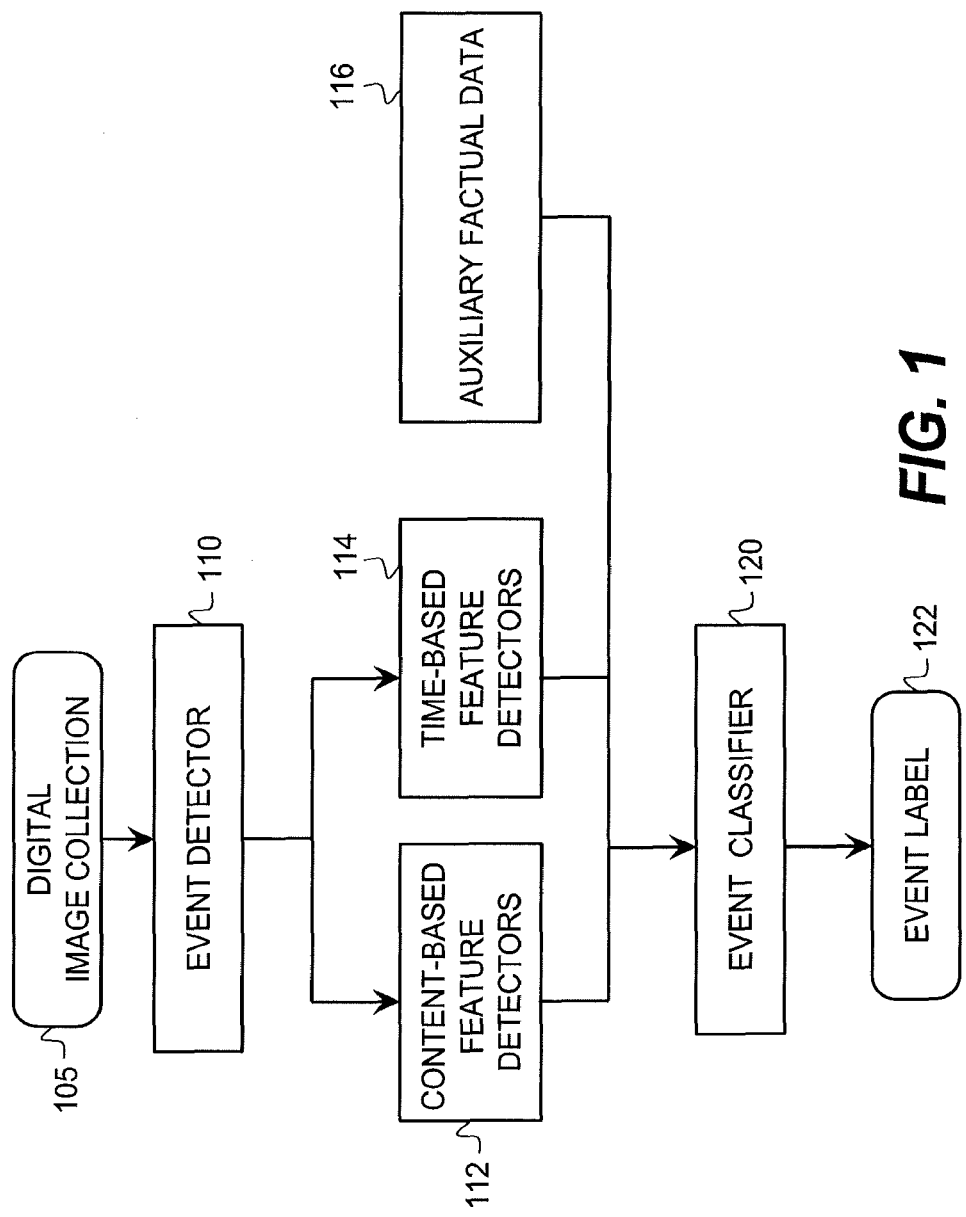
FIG. 1 is a flowchart of the method of the present invention.
Figure 2:
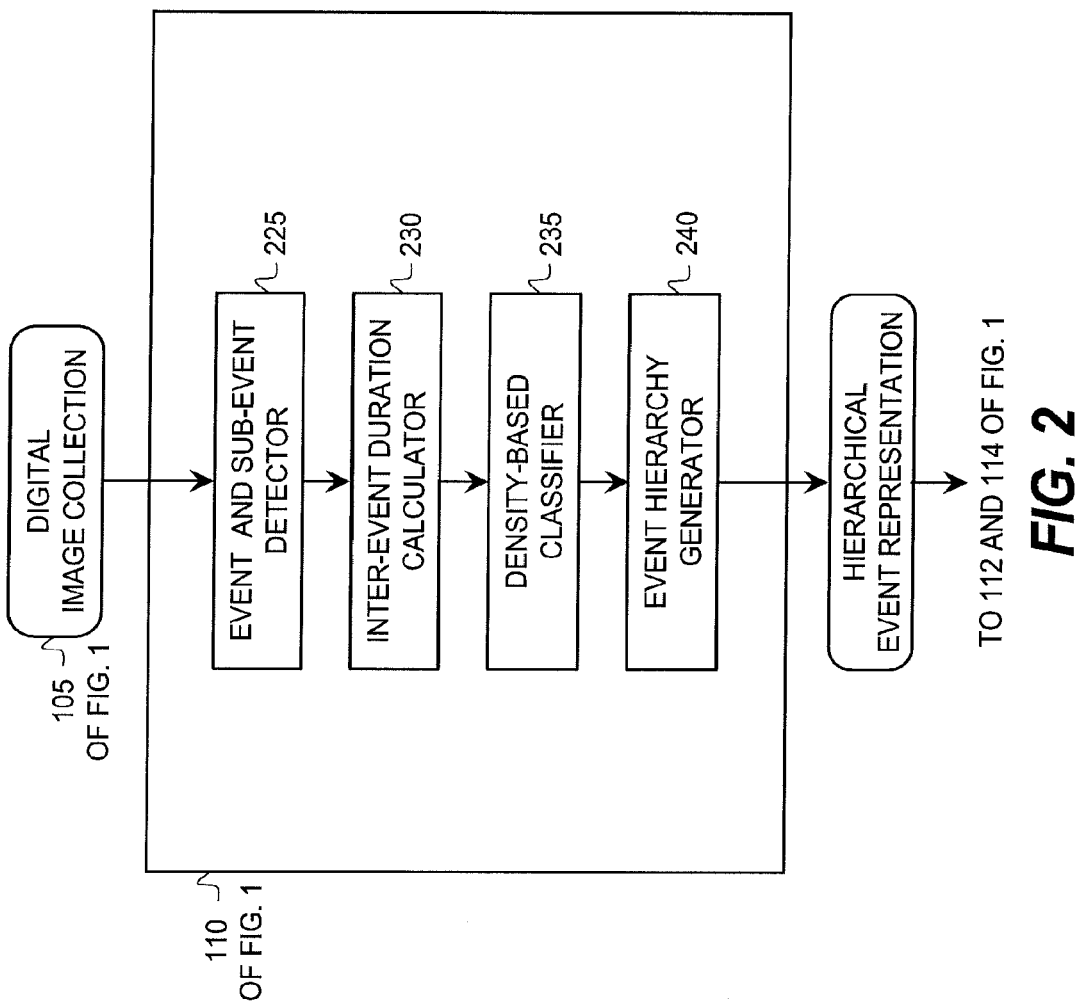
FIG. 2 is a flowchart of the method for creating a hierarchical event representation from an image collection.

Referring to FIG. 1, a user's digital image collection 105 is grouped into an event representation by the event detector 110. FIG. 2 shows the steps in creating a hierarchical event representation that has three-levels: super-events, events and sub-events. Referring to FIG. 2, the digital image collection 105 is first grouped into temporal events and sub-events using event and sub-event detector 225. Commonly assigned U.S. Pat. Nos. 6,606,411 and 6,351,556 disclose algorithms for clustering image content by temporal events and sub-events, the disclosures of which are incorporated herein. According to U.S. Pat. No. 6,606,411 events have consistent color distributions, and therefore, these pictures are likely to have been taken with the same backdrop. For each sub-event, a single color and texture representation is computed for all background areas taken together. The above two patents teach how to cluster images and videos in a digital image collection into temporal events and sub-events. The terms "event" and "sub-event" are used in an objective sense to indicate the products of a computer mediated procedure that attempts to match a user's subjective perceptions of specific occurrences (corresponding to events) and divisions of those occurrences (corresponding to sub-events). Briefly summarized, a collection of images is classified into one or more events determining one or more largest time differences of the collection of images based on time and/or date clustering of the images and separating the plurality of images into the events based on having one or more boundaries between events where one or more boundaries correspond to the one or more largest time differences. For each event, sub-events can be determined (if any) by comparing the color histogram information of successive images as described in U.S. Pat. No. 6,351,556. This is accomplished by dividing an image into a number of blocks and then computing the color histogram for each of the blocks. A block-based histogram correlation procedure is used as described in U.S. Pat. No. 6,351,556 to detect sub-event boundaries. Another method of automatically organizing images into events is disclosed in commonly assigned U.S. Pat. No. 6,915,011, which is herein incorporated by reference. Briefly summarized, according to one aspect of the above invention, an event clustering method uses foreground and background segmentation for clustering images from a group into similar events. Initially, each image is divided into a plurality of blocks, thereby providing block-based images. Utilizing a block-by-block comparison, each block-based image is segmented into a plurality of regions comprising at least a foreground and a background. One or more luminosity, color, position or size features are extracted from the regions and the extracted features are used to estimate and compare the similarity of the regions including the foreground and background in successive images in the group. Then, a measure of the total similarity between successive images is computed, thereby providing image distance between successive images, and event clusters are delimited from the image distances.

The events detected continue to be chronologically ordered in a timeline from earliest to latest. Using the method described above, it is not possible to detect single events that span a long period of time (days) and encompass a variety of activities and settings (for example, a long vacation covering multiple destinations) or events that occur in distinct parts separated by some hours from each other (for example, a sporting event with many matches or a wedding). Gaps in photo-taking corresponding to the overnight period also cause breaks in event continuity. Further processing is needed to detect these super-events, defined as a grouping of multiple contiguous events that may span multiple days.

Referring to FIG. 2, inter-event durations are computed for events detected by the inter-event duration calculator 230. The inter-event duration is the time duration between the last image of one event and the first image of the next event on a continuous timeline. The events are then treated as single points on a time axis, separated by the inter-event durations. A density-based clustering method is applied to these points (ref Data Mining Concepts and Techniques by Han and Kamber, Elsevier, 2006, pg. 418-420) by the density-based classifier 235. This algorithm grows regions with sufficiently high point density into clusters. This method enables points separated by relatively small duration gaps (for example, less than 18 hours) to be clustered together to form super-events. These typically represent longer duration or multi-part events in the user's collection. Smaller and isolated events appear as noise in this clustering method, and are left un-clustered. The final three-level hierarchical event representation is generated by the event hierarchy generator 240 and includes super-events, events and sub-events. After this point, the term "event" refers to the top-level of the hierarchical event representation—which can be a super-event or an event.

Referring to FIG. 1, algorithms for detecting content-based features are applied to each image in the collection using the content-based feature detectors 112. Content-based features refer to features that are computed from image pixels and that are intended to be an indicator of image content. This includes low-level features such as color and texture, and higher level features such as detection of faces or other objects. Commonly assigned U.S. Pat. No. 6,504,951 describes a method for detecting sky in an image. Classifying a scene as indoor or outdoor using camera metadata and image content is described in commonly assigned U.S. Patent Application Publication No. 2005/0105776. Scene classification (by way of example only, includes urban, field or nature scene) has been described in "Review of the state of the art in semantic scene classification," Computer Science TR 799, University of Rochester, 2002. Detection of a number of semantic classes (such as water, grass, snow, mountain, or buildings by way of example only) using supervised learning has been described in "Supervised learning of semantic classes for image annotation and retrieval," by Carneiro et al, IEEE Transactions on PAMI, March 2007. Using the temporal context of events during the computation of the image-level feature detection process is described in commonly assigned U.S. Patent Application Publication No. 2005/0105775. A method for describing images that can contain multiple valid classes is described in "Learning multi-label scene classification" by Boutell et al in Pattern Recognition 37 (2004). In addition, methods for detecting human faces are well known in the art of digital image processing, and can be used for obtaining a count of the number of faces in the image, approximate sizes of faces and locations of faces. For example, a face detection method for finding human faces in images is described in the following article: Jones, M. J.; Viola, P., "Fast Multi-view Face Detection," *IEEE Conference on Computer Vision and Pattern Recognition (CVPR)*, June 2003. A method for assigning a face to an age category is described in U.S. Pat. No. 5,781,650. The method uses ratios of facial measurements that are known to change with age due to bone structure development.

Table 1 has a list of example features that are collected from available algorithms. These features are found to be strongly correlated with the semantic event category. The first column of the table shows the name of the feature. The second column indicates the levels the feature can have. For example, in the simplest case, a feature can have only two levels—present and not present. The feature detection output can also be quantized into multiple levels to indicate either extent or degree of confidence of the feature. For some features, an experimentally determined threshold is used to test presence e.g. water is present if more than 25% of the image pixels are detected to be water (as shown in Table 1). This ensures that the feature is a significant part of the image. These features are detected at the image level. Image-level feature detection results are combined to obtain event-level content-based features. If a sufficient percentage of images in an event are tagged with the (non-zero) feature level, the event is tagged with that feature level. This threshold percentage is indicated in the third column of Table 1. For example, 15% of the images in an event would need to have a "Present" level for the feature "Grass" for the event to have the level "Present" for the feature "Grass."

Referring to FIG. 1, global time-based features are also detected for each of the events in the collection using time-based feature detectors 114. Time-based features refer to features computed from the capture date/time information obtained from the EXIF header of images or from similar metadata from other file formats. Global time-based features refer to time-based features that are computed at the event level from the capture date/time information of images included within the event. Table 2 shows some examples of time-based features. These include the duration of the event, duration between adjacent events (inter-event duration), number of images, time of day (e.g. morning, afternoon, night) and time of year. The duration of the event is computed as the difference between the capture time (as embedded in the EXIF header of the image by the camera at capture) of the first and last image of the event; the inter-event duration is the difference between the capture time of the last image of the event and the first image of the next event. The time of day is determined by the image at the center of the event timeline. The year is divided into the main seasons and is determined based on the month of capture of the event. The time-based features are detected at the event level. The third column of Table 2 shows the threshold used to determine the level for each of the features.

Figure 7:
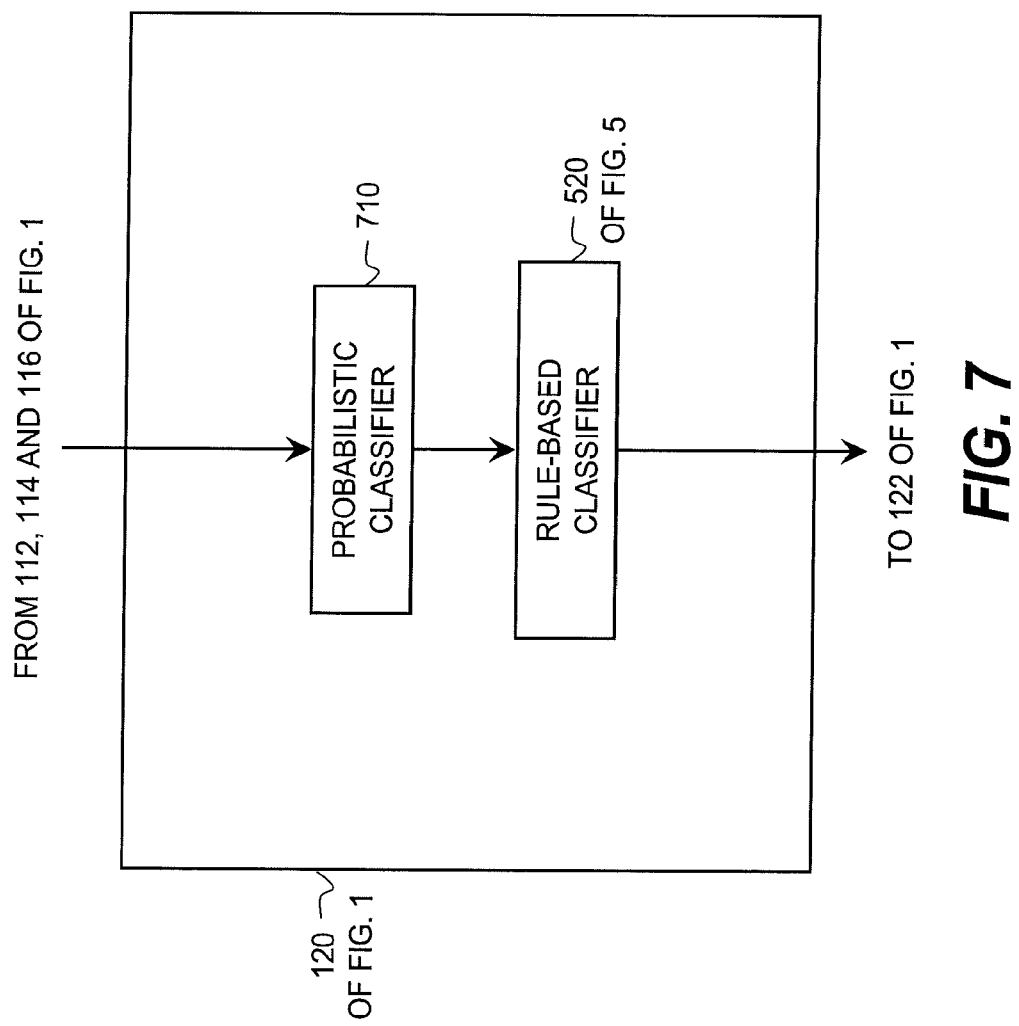
FIG. 7 illustrates an exploded view of the event classifier 120 of FIG. 1.

Semantic event categories are pre-determined based on studies of typical consumer picture-taking occasions and cover 80-90% of all images captured. Table 3 shows four top-level semantic event categories and their sub-categories. The features computed by 112 and 114 of FIG. 1 are provided as inputs to an event classifier 120 that produces an event label(s) 122 as the output. A number of classifiers have been described in the literature that can be trained to produce a finite number of output classifications from a set of input features. These include support vector machines, neural networks and Bayesian networks (ref. Pattern Classification by Duda, Hart and Stork, $2^{nd}$ ed., John Wiley and sons, 2000). Referring to FIG. 7, the event classifier 120 of FIG. 1 includes two stages. The preferred embodiment uses a Bayesian Belief Network (BBN) (ref Probabilistic Reasoning in Intelligent Systems by Judea Pearl, Morgan Kaufmann, 1988) as a probabilistic classifier 710. Other types of classifiers, including support vector machines and neural networks, can also be used. BBN is a form of probabilistic graphical modeling that enables modeling and reasoning about uncertainty. It is a directed acyclic graph which includes nodes that represent variables and arcs that represent conditional probabilities capturing probabilistic dependencies between variables. During the training phase, the conditional probabilities corresponding to each arc of the Bayesian belief network and the a priori probabilities of the output labels are learned. After training, the output node then produces the probability of each of the output labels given the input observations. A key feature of BBN is that it is capable of handling incomplete information gracefully.

Figure 3:
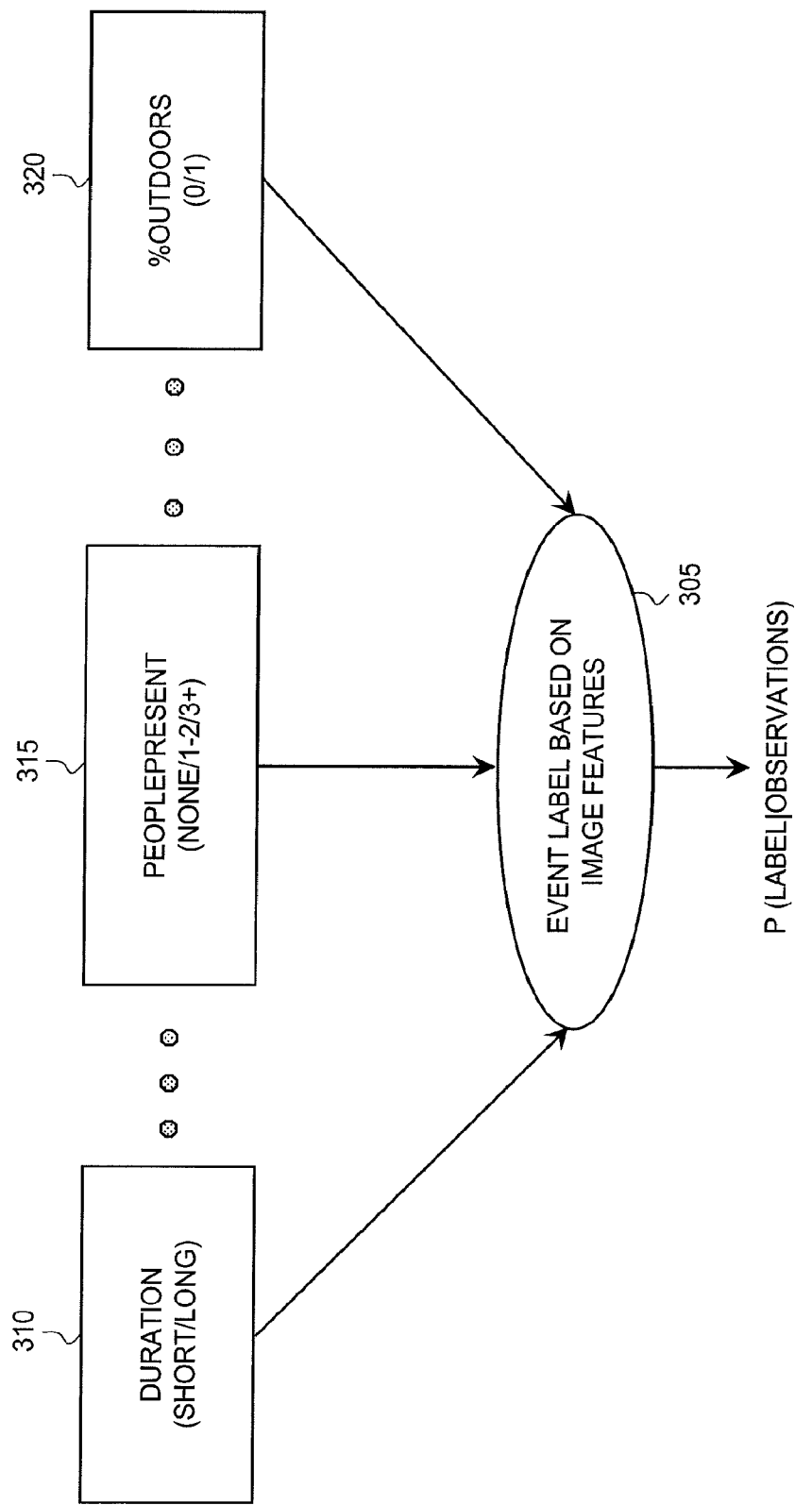
FIG. 3 illustrates the Bayesian net for event classification using time-based and content-based features.

The Bayesian Belief Network is set up as shown in FIG. 3. The input nodes include the time-based features detected by the time-based feature detectors 114 including but not limited to those listed in Table 2, such as duration 310; and the content-based features detected by the content-based feature detectors 112, including but not limited to those listed in Table 1, such as people present 315 and % Outdoors 320. An output node 305 computes the event labels based on the time-based and content-based image features.

The accuracy of the classifier may be further improved by consideration of auxiliary factual data (information) directly or indirectly associated with the captured event, illustrated as box 116 in FIG. 1. Examples of such factual information might include, but is not limited to, knowledge of familial relationships between people, personal calendars, geographic information, and data considered common sense knowledge. Such factual information also includes the non-content based capture metadata typically recorded in common image file formats such as EXIF, including the subject distance and the camera scene mode. Each of these types of information may be used to refine or validate the classification provided by the event classifier, and are included to create an extended feature set.

Figure 4:
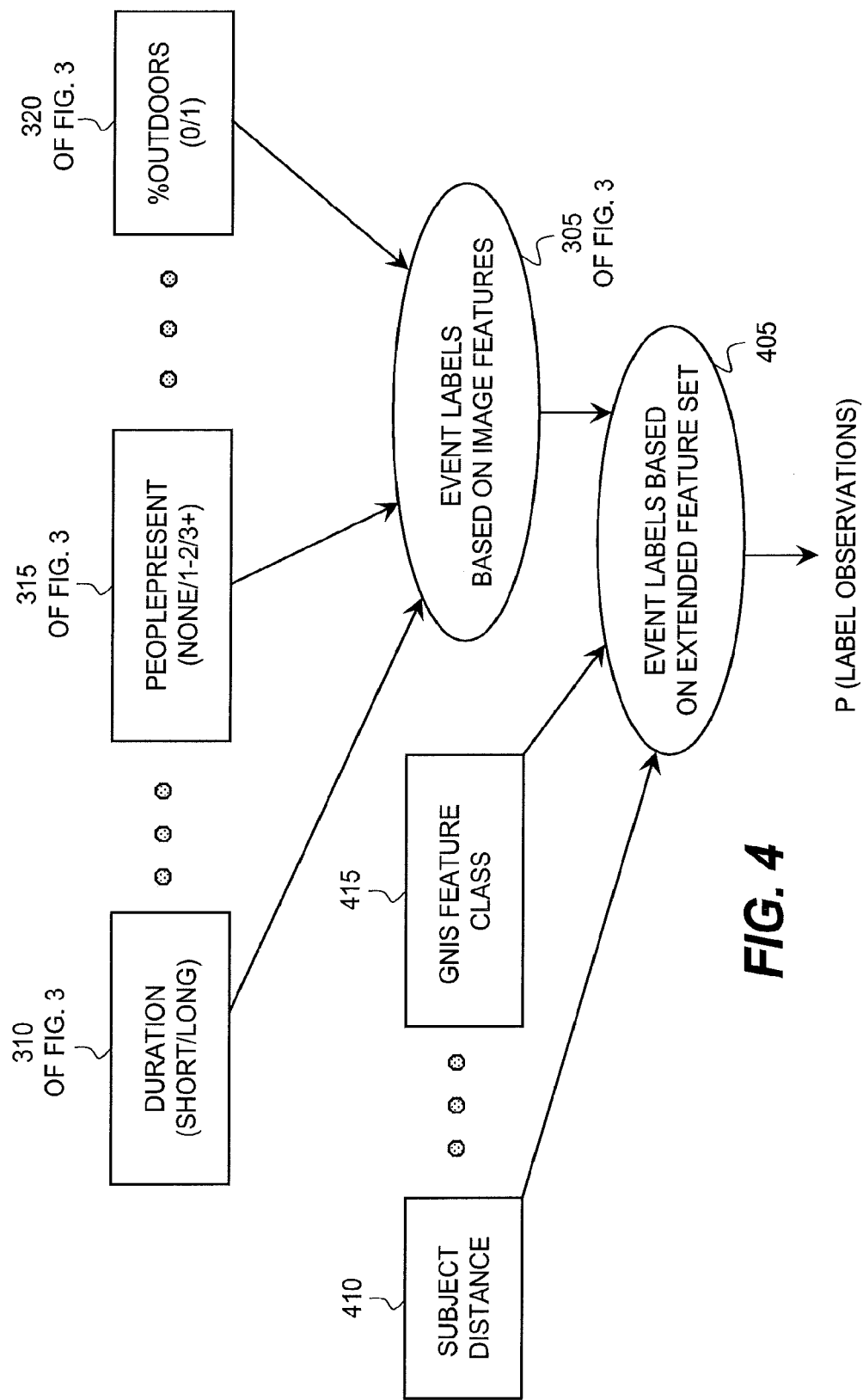
FIG. 4 illustrates the Bayesian net for event classification with a broader set of features.

Such factual information can be applied by the system as part of the BBN. FIG. 4 illustrates how these types of data can factor into the classification. For example, training data can be collected that indicates that a greater subject distance tends to be associated with sporting events and vacations than family moments and social gatherings, helping to further improve the accuracy of the BBN. In some cases camera metadata can be combined with auxiliary knowledge bases to produce other input values for the BBN. Digital capture devices are increasingly capturing GPS coordinates at the time of capture; geolocation data can also be manually added to an image. Given the latitude and longitude of where an event occurred, such coordinates can be mapped to a geographic feature class, using an auxiliary database such as the U.S. Geological Survey's Board of Geographic Names Geographic Names Information System (GNIS). Feature classes include bodies of water as well as facilities such as schools. It is expected that a sporting event is less likely to take place at a cemetery than a school; a social gathering is more likely to take place at a church than an airport. Referring to FIG. 4, node 405 computes event labels based on the extended feature set, including but not limited to a subject distance 410 and the GNIS Feature Class 415, along with the output of node 305 of FIG. 3 that factors in the effect of time-based and content-based features described earlier. The event is then labeled with the event class that has the highest probability.

Figure 6:
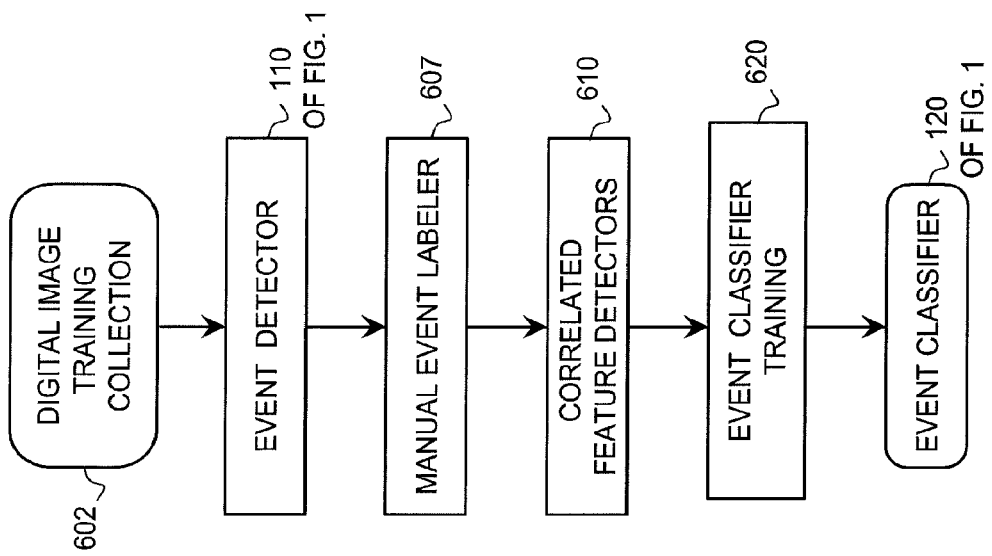
FIG. 6 is a flowchart for training the Bayesian net for event classification.

The BBN is trained on labeled input/output data to calculate the conditional probabilities at each arc of the network. The a priori probabilities (or priors) are also learned from the labeled training data. Referring to FIG. 6, a digital image training collection 602 spanning multiple years is collected from a number of consumers. Events and super-events are detected in the collections using the hierarchical event detector 110 from FIG. 1. The events are then labeled by a human manual event labeler 607 into one of the pre-determined set of event categories listed in Table 3 (or "Other" if none are appropriate). The features described earlier are computed for each event using correlated feature detectors 610, which includes the content-based feature detectors 112 and the time-based feature detectors 114 of FIG. 1. This forms the training set for the Bayesian belief network. The BBN is trained for the top-level event category (in one embodiment, vacation, sports, family moments and social gathering) using an event classifier training component 620. The rule-based system described later is used to determine the sub-category.

TABLE 1

List of Content-based event-level features

| Name | Levels | % images in event |
| --- | --- | --- |
| People present | None/1-2/3+ | 25 |
| Children under 4 yrs | None/1-2/3+ | 25 |
| Indoor/outdoor | Indoor/outdoor | 25 |
| Urban | NotUrban/Urban | 20 |
| Beach | NotBeach/Beach | 5 |
| Sky | <10% area/>10% | 10 |
| Grass | NotPresent/Present | 15 |
| Water | <25% area/>25% | 10 |
| Field | NotPresent/Present | 25 |
| NatureScene | NotPresent/Present | 12 |

TABLE 2

List of Time-based event-level features

| Name | Levels | Threshold |
| --- | --- | --- |
| Duration | Short/long | 1.5 hours |
| Inter-event duration | Short/long | 2 days |
| Time of day | Morning/Later | 12 pm |
| Time of year | Summer/Winter/Other | Jun-Aug/Dec-Feb/Rest |
| Number of Images | Few/Many | 15 |

TABLE 3

List of top level event categories and their sub-categories

| Vacation | Sports | Family Moments | Social Gathering |
| --- | --- | --- | --- |
| Daytrip | Field | Children | Wedding |
| Weekend | Water | Parents | Birthday |
| Getaway | Indoor | Siblings | Holiday |
| Holiday | Other | Grandparents | Party |

Figure 5:
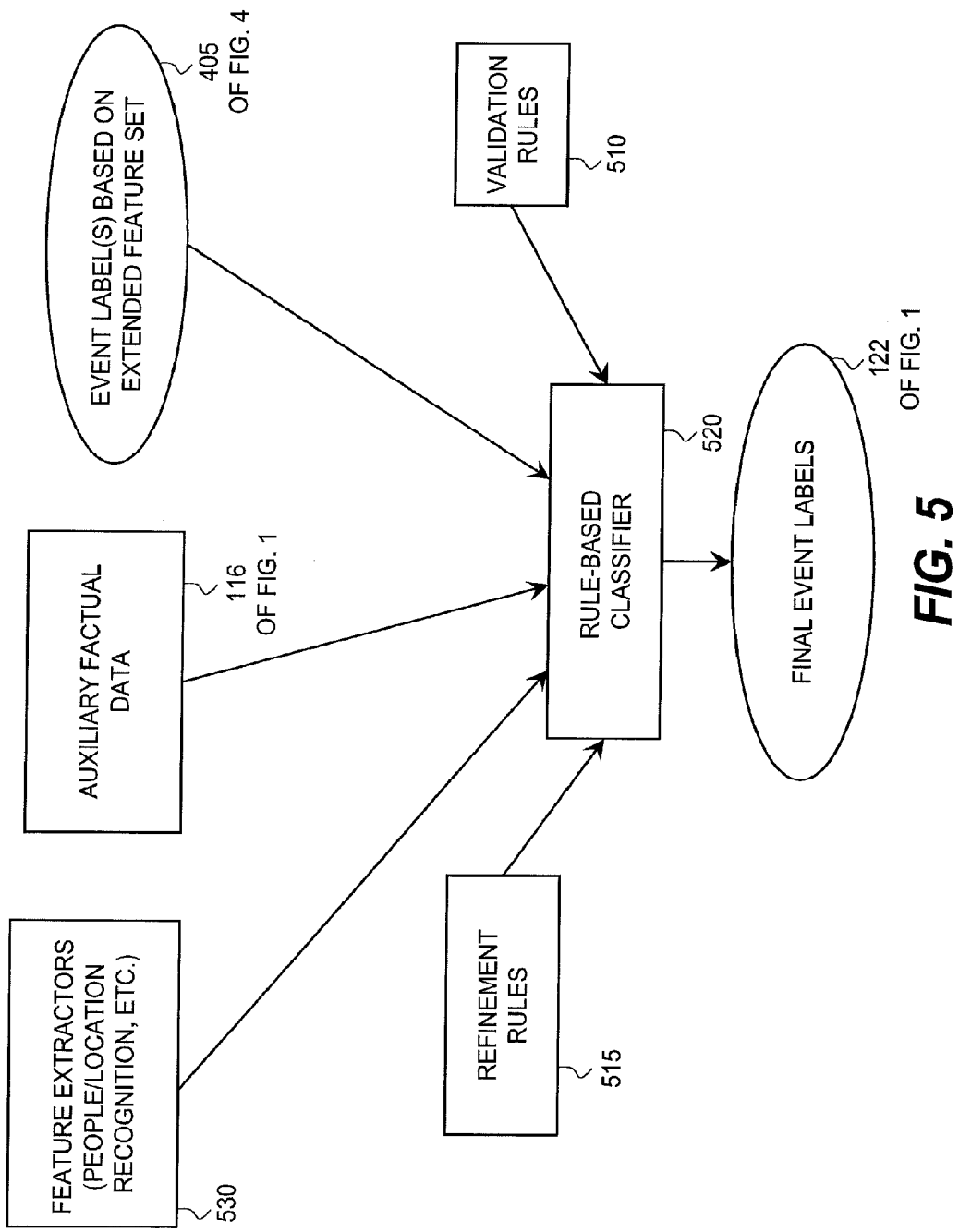
FIG. 5 illustrates the rule-based modification of Bayesian event classifier output.

Since conditional probabilities for some of the features in the extended feature set can be difficult or infeasible to obtain through training data, the system can also optionally apply heuristics or rules to validate or refine the output of the BBN of FIG. 4. Referring to FIG. 7, the output of the BBN-based classifier 710 can be passed to a rule-based classifier 520, where the details of the rule-based classifier are shown in FIG. 5. The rules can be based upon domain-specific knowledge, informal common sense knowledge, or formalized common sense knowledge bases such as Cyc or Open Mind Common Sense. For example, the classification "Family Moments" generated by the BBN can be validated by a rule that requires the event to portray at least one or more people that are known to be family members of the system user; if this condition does not hold, then the event is reclassified as "Social Gathering." Application of such a rule requires first use of a people recognition algorithm (U.S. Patent Application Publication No. 2008/0112621; U.S. Patent Application Publication No. 2007/0177805; and U.S. Patent Application Publication No. 2007/0098303) to determine the identity of the individuals portrayed in the assets malting up the event, and then consultation of the auxiliary factual database 116 of FIG. 1 to determine the relationship of each individual to the user of the system. Such relationships can be explicitly stored in the database for every combination of user and individual; alternatively, the system can store only canonical relationships, and infer specific relationships as requested.

Rules are also used to further refine event categories to subcategories. For example, the BBN may not be able to significantly distinguish between the various subcategories of party for a particular event, but rules leveraging auxiliary data can make the distinction. Suppose the BBN has determined a top-level category of "Social Gathering." A rule-based approach can apply the sub-category "Social Gathering-birthday" by using the results of the people recognition algorithm to determine the people portrayed in the event and applying the common sense rule that states that a social gathering is a birthday party if a person portrayed in the event has a birthday at or near the time of the event; information about individual birthdays is part of the data stored in an auxiliary factual database 116 of FIG. 1. While this classification could also potentially be generated by the BBN of FIG. 4 given the appropriate priors, computing such priors requires sufficient training data; the use of a common sense rule eliminates the need for such data.

The BBN of FIG. 4 is used to compute a set of candidate event classifications along with their associated probabilities. Referring to FIG. 7, the second stage of the event classifier 120 of FIG. 1 is the rule-based classifier 520 of FIG. 5. FIG. 5 illustrates the steps applied in using rules to validate or refine event categories generated by the BBN in the preferred embodiment. Validation rules 510 and refinement rules 515 are run by a rule-based classifier 520. Validation rules 510 determine if, given the additional feature data from feature extractors 530 as well as the data from the auxiliary factual database 116, the event labels 405 are valid; the highest probability classification passing the validity test is output as the event class. Refinement rules 515 refine the event labels 405 using additional features from feature extractors 530, as well as the data from the auxiliary factual database 116 from FIG. 1, to determine a refined semantic event sub-category. The feature extractors 530 include but are not limited to content-based feature detectors 112 and time-based feature detectors 114 from FIG. 1. In one embodiment, the rule-based system in FIG. 5 computes the sub-categories using the following rules, after the top-level category is determined using the BBN of FIG. 4:

Vacation: "Daytrip" if event duration is within the same calendar day, "Weekend" if event falls during the weekend days, "Getaway" if the vacation is long (greater than 4 days), "Holiday" if it falls during a holiday and the location is determined to be outside the user's home area.

Sports: "Field" if results from detector for field and "grass" are positive, "Water" if result from detector for water is positive, "Indoor" if result of indoor/outdoor detector is indoor, and "Other" if none of the above detectors show positive result.

Family Moments: The category is based on the relationship of the user to the people recognized in the images.

Social Gathering: "Wedding" and "Birthday" are based on information from the personal calendar of a user, "Holiday" is based on the calendar and holidays observed in the user's geographic location, and "Party" is based on the presence of many people recognized by the people recognition system as being commonly occurring in the user's collection (i.e. not strangers).

Referring to FIG. 7, some embodiments can eliminate the probabilistic classifier 710. In this case, the rules executed by the rule-based classifier 520 do not reference the event label(s) based on the extended feature set 405 of FIG. 4. Likewise, some embodiments cannot incorporate the rule-based classifier 520, producing event labels based on the probabilistic classifier alone.

In addition to permitting the user to search and browse by event type, the semantic category of event can be used to author creative output for the user. This semantic information together with other contextual information (including, but not limited to image metadata, date/time, GPS, location, or any combination thereof) can be input into an automatic albuming system for generating themed and personalized album based on the type of event detected. For example, a vacation in Europe will suggest the use of a relevant background design and theme that reflects the cultural and regional characteristic of the location where the event took place. A party event will evoke the use of a fin and whimsical theme and mood for the album. Other custom output products can be created using the event information including collages, cups, T-shirts, and multimedia DVD and CD that includes audio and music. In addition, the semantic event information enables more efficient searching and browsing of the user collection. For instance, the user can easily search by text when the events have been automatically annotated by the system. Yet another application will be for targeted advertising based on the event detected. For example, when an outdoor sporting event is detected, relevant advertising of sporting goods can be targeted to the user.

The invention has been described in detail with particular reference to certain preferred embodiments thereof, but it will be understood that variations and modifications can be effected within the spirit and scope of the invention.

PARTS LIST

105 Digital image collection
110 Hierarchical event detector
112 Content-based feature detectors
114 Time-based feature detectors
116 Auxiliary factual data
120 Event classifier
122 Event label
225 Event and sub-event detector
230 Inter-event duration calculator
235 Density-based classifier
240 Event hierarchy generator
305 Event labels based on image features node
310 Duration node
315 People present node
320 % Outdoors node
405 Event labels based on extended feature set node
410 Subject distance node
415 GNIS feature class node
510 Validation rules
515 Refinement rules
520 Rule-based classifier
530 Feature extractors
602 Digital image training collection
607 Manual event labeler
610 Correlated feature detectors
620 Event classifier training
710 Probabilistic classifier

The invention claimed is:

1. A method comprising:
   generating, using a processor, an event representation of an image collection;
   computing global time-based features for each event within a hierarchical event representation;
   computing image-level content-based features for each image in an event within the hierarchical event representation;
   combining image-level content-based features for each image in an event to generate event-level content-based features;
   classifying, using time-based features including at least one of a duration of event, inter-event duration, or number of images in the event and event-level content-based features, each event into a category from a pre-determined set of top-level event categories; and
   validating, using a rule-based system, each event belongs to an associated category based on the event-level content-based features; and
   refining the category of at least one event into a sub-category based on the event-level content-based features.

2. The method of claim 1, wherein at least one of the pre-determined set of top-level event categories includes vacation, sports, family moments or social gathering.

3. The method of claim 1, wherein the image-level content-based features include people present, ages of people present, indoor or outdoor, scene type, or materials present.

4. The method of claim 1, wherein the hierarchical event representation includes at least two levels.

5. The method of claim 1, wherein classifying each event comprises using a probabilistic classifier, a rule-based classifier or a combination thereof.

6. The method of claim 1, wherein the validating each event comprises referencing a database of auxiliary factual information associated with subjects identified in the image collection.

7. The method of claim 1, wherein the refining the category of at least one event comprises referencing a database of auxiliary factual information associated with subjects identified in the image collection.

8. The method of claim 1, further comprising calculating a subject distance for each image in an event within the hierarchical event representation, wherein the classifying each event is based upon the subject distances.

9. The method of claim 8, further comprising determining a location for each image in an event within the hierarchical event representation, wherein the classifying each event is based upon the locations.

10. The method of claim 1, further comprising determining sub-events for each event.

11. A system comprising:
    one or more electronic processors configured to:
       generate an event representation of an image collection;
       compute global time-based features for each event within a hierarchical event representation;
       compute image-level content-based features for each image in an event within the hierarchical event representation;
       combine image-level content-based features for each image in an event to generate event-level content-based features;
       classify, using time-based features including at least one of a duration of event, inter-event duration, or number of images in the event and event-level content-based features, each event into a category from a pre-determined set of top-level event categories;
       validate, using a rule-based system, each event belongs to an associated category based on the event-level content-based features; and
       refine the category of at least one event into a sub-category based on the event-level content-based features.

12. The system of claim 11, wherein the one or more processors are further configured to reference a database of auxiliary factual information associated with subjects identified in the image collection to validate each event.

13. The system of claim 11, wherein the one or more processors are further configured to reference a database of auxiliary factual information associated with subjects identified in the image collection to refine the category of at least one event.

14. The system of claim 11, wherein the one or more processors are further configured to calculate a subject distance for each image in an event within the hierarchical event representation, wherein the classifying each event is based upon the subject distances.

15. The system of claim 14, wherein the one or more processors are further configured to determine a location for each image in an event within the hierarchical event representation, wherein the classifying each event is based upon the locations.

16. A non-transitory computer-readable medium having instructions stored thereon, the instructions comprising:
   instructions to generate an event representation of an image collection;
   instructions to compute global time-based features for each event within a hierarchical event representation;
   instructions to compute image-level content-based features for each image in an event within the hierarchical event representation;
   instructions to combine image-level content-based features for each image in an event to generate event-level content-based features;
   instructions to classify, using time-based features including at least one of a duration of event, inter-event duration, or number of images in the event and event-level content-based features, each event into a category from a pre-determined set of top-level event categories;
   instructions to validate, using a rule-based system, each event belongs to an associated category based on the event-level content-based features; and
   instructions to refine the category of at least one event into a sub-category based on the event-level content-based features.

17. The non-transitory computer-readable medium of claim 16, wherein the instructions to validate each event comprises instructions to reference a database of auxiliary factual information associated with subjects identified in the image collection.

18. The non-transitory computer-readable medium of claim 16, wherein the instructions to refine the category of at least one event comprises instructions to reference a database of auxiliary factual information associated with subjects identified in the image collection.

19. The non-transitory computer-readable medium of claim 16, wherein the instructions to classify each event comprises instructions to calculate a subject distance for each image in an event within the hierarchical event representation, wherein the classifying each event is based upon the subject distances.

20. The non-transitory computer-readable medium of claim 19, wherein the instructions to classify each event comprises instructions to determine a location for each image in an event within the hierarchical event representation, wherein the classifying each event is based upon the locations.

* * * * *

UNITED STATES PATENT AND TRADEMARK OFFICE
CERTIFICATE OF CORRECTION

| | | |
|---|---|---|
| PATENT NO. | : 8,611,677 B2 | Page 1 of 1 |
| APPLICATION NO. | : 12/273600 | |
| DATED | : December 17, 2013 | |
| INVENTOR(S) | : Das et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1055 days.

Signed and Sealed this
Twenty-first Day of April, 2015

Michelle K. Lee
*Director of the United States Patent and Trademark Office*